United States Patent
Braun et al.

(10) Patent No.: US 9,966,884 B2
(45) Date of Patent: May 8, 2018

(54) METHOD AND DEVICE FOR DETERMINING THE ROTOR POSITION AND SPEED OF A ROTATING FIELD MACHINE

(75) Inventors: Martin Braun, Neustetten-Wolfenhausen (DE); Thomas Gaberan, St. Denis les Bourg (FR); Gilles Schmitt, Gravenhage (NL)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 14/345,525

(22) PCT Filed: Aug. 3, 2012

(86) PCT No.: PCT/EP2012/065283
§ 371 (c)(1),
(2), (4) Date: Oct. 14, 2014

(87) PCT Pub. No.: WO2013/041287
PCT Pub. Date: Mar. 28, 2013

(65) Prior Publication Data
US 2015/0048768 A1    Feb. 19, 2015

(30) Foreign Application Priority Data

Sep. 20, 2011 (DE) .................. 10 2011 083 019

(51) Int. Cl.
*H02P 6/16* (2016.01)
*G01P 3/487* (2006.01)
(Continued)

(52) U.S. Cl.
CPC ............. *H02P 6/165* (2013.01); *G01D 5/145* (2013.01); *G01P 3/487* (2013.01); *H02P 6/16* (2013.01);
(Continued)

(58) Field of Classification Search
CPC .. E05F 15/603; E05F 15/668; E05Y 2400/30; H02P 6/16; G01D 5/145; G01D 5/147; H02K 29/08; G01P 3/487
See application file for complete search history.

(56) References Cited

U.S. PATENT DOCUMENTS

| 4,931,982 A * | 6/1990 | Hayashida .......... B29C 47/0021 |
| | | 425/141 |
| 5,804,940 A * | 9/1998 | Erkens .................... G05B 19/19 |
| | | 318/364 |

(Continued)

FOREIGN PATENT DOCUMENTS

| DE | 19735581 | 2/1999 |
| DE | 19949106 | 5/2001 |

OTHER PUBLICATIONS

Stika et al. ("A new cost effective Solution for control of electrical actuators", Advanced Topics in Electrical Engineering (ATEE), 2011 7th InternationalSymposium on, IEEE, May 12, 2011, pp. 1-4,XP031893773, ISBN: 978-1-4577-0507-6).*

(Continued)

*Primary Examiner* — Shawki S Ismail
*Assistant Examiner* — Zoheb Imtiaz
(74) *Attorney, Agent, or Firm* — Norton Rose Fulbright US LLP; Gerard Messina

(57) ABSTRACT

A method for determining the rotor position and the rotational speed of a rotating field machine, including, based on Hall sensor signals, a step of determination of a sector in which a rotor of the rotating field machine is situated and a step of determination of a preliminary rotational speed of the rotating field machine. In a step of determination, the rotor position and the rotational speed are determined based on the sector and on the preliminary rotational speed, an (Continued)

observer of the rotating field machine being used at least for the determination of the rotational speed.

13 Claims, 4 Drawing Sheets

(51) Int. Cl.
  *G01D 5/14* (2006.01)
  *H02P 6/34* (2016.01)
  *H02P 6/17* (2016.01)
  *H02P 21/18* (2016.01)
(52) U.S. Cl.
  CPC .............. *H02P 6/17* (2016.02); *H02P 6/34* (2016.02); *H02P 21/18* (2016.02)

(56) References Cited

U.S. PATENT DOCUMENTS

| | | | | |
|---|---|---|---|---|
| 6,029,099 | A * | 2/2000 | Brown | G06N 99/005 700/245 |
| 6,225,770 | B1 * | 5/2001 | Heinrich | E05F 15/603 318/463 |
| 6,236,905 | B1 * | 5/2001 | Whitmarsh | A61G 3/06 700/217 |
| 2001/0010453 | A1 * | 8/2001 | Marcinkiewicz | H02P 25/08 318/727 |
| 2004/0245960 | A1 * | 12/2004 | Bartolotti | H02K 29/08 318/715 |
| 2005/0275361 | A1 * | 12/2005 | Bolt | H02P 6/16 318/400.04 |
| 2006/0290302 | A1 * | 12/2006 | Marcinkiewicz | H02P 6/18 318/66 |

OTHER PUBLICATIONS

International Search Report for PCT/EP2012/065283, dated Oct. 30, 2012.

Stika I. C., et al., "A New Cost Effective Solution for Control of Electrical Actuators", Advanced Topics in Electrical Engineering, pp. 1-4, 2011.

Sandee J. H. et al., "Analysis and Experimental Validation of a Sensor-Based Event-Driven Controller", American Control Conference; pp. 2867-2874, 2007.

* cited by examiner

METHOD AND DEVICE FOR DETERMINING THE ROTOR POSITION AND SPEED OF A ROTATING FIELD MACHINE

FIELD OF THE INVENTION

The present invention relates to a method and to a device for determining the rotor position and the rotational speed of a rotating field machine, and to a rotating field machine.

BACKGROUND INFORMATION

German Published Patent Appln. No. 11 2008 001 818 describes an electric motor control unit for determining the rotational position of the motor based on electric voltages and currents applied to the motor.

SUMMARY

Against this background, the present invention presents a method for determining the rotor position and the rotational speed of a rotating field machine, and presents a device that uses this method, as well as, finally, a corresponding computer program product.

Using Hall sensors and an observer structure, a disturbance-resistant determination of the rotor position and of the rotational speed of a rotating field machine can be carried out. The rotating field machine can be provided for example for an electric turbo compressor. The rotational speed can be determined here using an observer.

Through the observer, it can be avoided that an occurrence of disturbances in the Hall signals causes errors in the calculation of the rotational speed, and thus disturbances in the rotor position. It can also be avoided that a regulation of the stator current, and a regulation of the rotational speed of the rotating field machine, become unstable due to disturbances that occur, which could cause malfunctions and shutting off of the turbo compressor. The observer also makes it possible to drive small rotational speeds very precisely and in a regulated manner without large fluctuations. In addition, it can be avoided that an impermissible phase shift occurs between the calculated rotational speed and the rotor position, which would have to be corrected using static filters.

The present invention creates a method for determining the rotor position and the rotational speed of a rotating field machine, including the following steps:
determination of a sector in which a rotor of the rotating field machine is situated, based on Hall sensor signals, the Hall sensor signals representing signals outputted by Hall sensors situated in the region of the rotor;
determination of a preliminary rotational speed of the rotating field machine, based on the Hall sensor signals; and
determination of the rotor position and of the rotational speed based on the sector and on the preliminary rotational speed, using an observer of the rotating field machine at least for the determination of the rotational speed.

The rotating field machine can be an electric motor that is operated with a polyphase alternating current. Standardly, this is a three-phase alternating current. Using coils, magnetic fields are generated by the polyphase alternating current, which fields exert a torque on the rotor of the rotating field machine and thereby bring about a rotational movement of the rotor relative to a stator of the rotating field machine. A complete rotation of the rotor represents a circle that can be divided into a plurality of sectors, so that during a complete rotation the rotor runs through the plurality of sectors. Here, the number of sectors can correspond to the number of phases of the polyphase alternating current. If the number of sectors is three, each sector can be assigned an angular segment of 120° of a complete rotation, so that all the sectors in succession result in a complete circle. A change of sector can take place when, due to the rotation of the rotor, a reference point situated on the rotor moves from one sector into an adjacent sector. The rotor can be fashioned to produce a magnetic field. The rotor can be a shaft having a permanent magnet. The number of Hall sensors can correspond to half the number of sectors. Each of the Hall sensors can be fashioned to acquire a direction of a magnetic field of the rotor. Each Hall sensor is fashioned to output a Hall sensor signal that can represent a direction of the magnetic field of the rotor relative to the respective Hall sensor. Thus, a Hall sensor signal can have a first value when the magnetic field has a first direction relative to the Hall sensor, and can have a second value when the magnetic field has a second direction relative to the Hall sensor. The sector in which the rotor is currently situated can be determined, with knowledge of the configuration of the Hall sensors, by evaluating the values of the Hall sensor signals. The preliminary rotational speed can be evaluated based on signal edges that cause a changeover between the first and second value of a Hall sensor signal. The preliminary rotational speed can be a rotational speed of the rotor determined from the Hall sensor signals, for example through differentiation. The rotor position can be a position of the rotor, for example relative to a reference point situated on the stator. The observer can include a model of the rotating field machine. The observer can be a state observer. For example, the model can reproduce the mechanical part of the rotating field machine. The observer can be a complete observer, for example a Luenberger observer. As input quantities, measurement quantities, or values determined from measurement quantities, can be supplied to the observer. As output quantity, the observer can output at least one value for the rotational speed. Through the rotational speed outputted by the observer, the rotational speed of the rotor can be indicated more precisely than through the preliminary rotational speed. Thus, a method is created for the disturbance-resistant determination of the rotor position and of the rotational speed of a rotating field machine, for example for an electric turbo compressor, using Hall sensors. The rotor position determined in disturbance-resistant fashion and rotational speed determined in disturbance-resistant fashion enable a clean provision of sinusoidal current and thus a stable rotational speed regulation at low rotational speeds.

According to a specific embodiment, the method can include a step of determination of a direction of rotation of the rotor based on the Hall sensor signals. In the step of determination, the rotor position can be determined based on the sector, the direction of rotation, and the rotational speed. The rotational speed can be determined using the observer, based on the preliminary rotational speed and on a current that causes a torque of the rotor. The direction of rotation can be determined from an evaluation of a sequence of values of the Hall sensor signals. The current can be a current in the q direction. The q direction can relate to a d-q system relative to the rotor, which can be calculated through suitable transformations from a polyphase system relative to the stator. The torque of the rotating field machine can be set by setting the current in the q direction. Here, the observer can represent a rotational speed observer that outputs the rotational speed as output quantity. In this way, the rotational speed can be determined in a highly disturbance-resistant manner. Because the rotational speed outputted by the observer enters into the determination of the rotor position, the rotor position can also be determined in a highly disturbance-resistant manner.

In the step of determination, the rotor position can be determined based on a summation of the rotational speed. The summation can take place through integration. Here, a change of sector can in each case cause a resetting of the summation. In this way, the rotor position can be determined very precisely.

According to a further specific embodiment, the method includes a step of determination of an acceleration of the rotor based on the Hall sensor signals. In the step of determination, the rotor position and the rotational speed can be determined using the observer, based on the sector, the preliminary rotational speed, and the acceleration. Through the observation of the rotor position and of the rotational speed, both parameters can be determined very precisely.

In this context, in the step of determination, the rotor position and the rotational speed when there is a change of sector can be determined based on the sector and on the preliminary rotational speed, and otherwise can be determined based on a rotor position determined and sent back using the observer, and a rotational speed determined and sent back using the observer. In this way, when there is a change of sector values can be used that have been determined from the Hall sensor signals. If, on the other hand, a change of sector is not present, the values determined by the observer can be used. In this way, precise values are always available as input quantities for the observer.

According to a specific embodiment, the method can include a step of reception and plausibilization of the Hall sensor signals. In this way, the incoming Hall sensor signals can be checked. The plausibilization can for example include a low-pass filtering. Hall signals having disturbances can be excluded or corrected by a further evaluation. In this way, it can be avoided that disturbing effects falsify the further evaluation.

In addition, in the step of determination of the sector, the sector can be determined based on a temporal sequence of the Hall sensor signals. In the step of determination of the preliminary rotational speed, the preliminary rotational speed can be determined from a temporal difference between successive edges of the Hall sensor signals. For example, a change of edge of one or more of the Hall sensor signals can indicate a change of sector. The preliminary rotational speed can be determined through a differentiation of the Hall sensor signals. Thus, recourse can be had at first to known methods for determining the sector and the preliminary rotational speed.

In addition, the present invention creates a device for determining the rotor position and the rotational speed of a rotating field machine, the device being fashioned to carry out the steps of a method according to a specific embodiment of the present invention. The device is fashioned to carry out or to realize the steps of the method in corresponding devices. In the present context, a device can be understood as an electrical apparatus that processes sensor signals and outputs control signals as a function thereof. The device can have an interface that can be realized in hardware and/or in software. In the case of a realization in hardware, the interfaces can for example be part of a so-called system ASIC that contains a wide range of functions of the device. However, it is also possible for the interfaces to be independent integrated circuits, or to be made up at least partly of discrete components. In the case of a realization as software, the interfaces can be software modules that are present for example on a microcontroller alongside other software modules.

In addition, the present invention creates a rotating field machine having the following features:

a rotor;

a stator having at least three Hall sensors, each of the Hall sensors being fashioned to acquire a direction of a magnetic field of the rotor and to output a Hall sensor signal as a function of the direction; and a device for determining the rotor position and the rotational speed of a rotating field machine based on the Hall sensor signals outputted by the at least three Hall sensors.

A computer program product is also advantageous having program code that can be stored on a machine-readable carrier such as a semiconductor storage device, a hard drive storage device, or an optical storage device, and that is used to carry out the method according to one of the above-described specific embodiments when the program is executed on a computer or on a device.

Different specific embodiments of the approach according to the present invention enable the calculation of disturbance-resistant signals for the rotor position and the rotational speed of a rotating field machine from measured Hall signals of a rotating field machine, for example for a turbo compressor. Overall, very disturbance-resistant and robust signals can be obtained for the rotor position and for the rotational speed of the rotating field machine. In this way, very low rotational speeds can also be realized in a regulated manner. The stator current and rotational speed regulation is no longer influenced in an impermissible manner by disturbances, and is thus permanently in the stable range.

DETAILED DESCRIPTION

Figure 1:
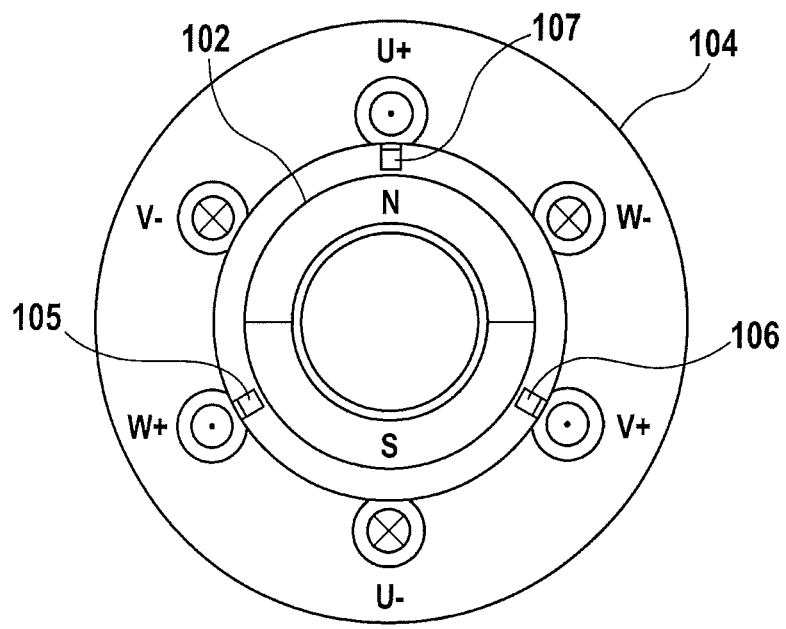
FIG. 1 shows a schematic representation of a rotating field machine.

In the following description of preferred exemplary embodiments of the present invention, identical or similar reference characters are used for elements shown in the various Figures and having similar action, and repeated description of these elements is omitted.

FIG. 1 shows a schematic representation of a rotating field machine having a rotor 102 and a stator 104. Rotor 102 is rotatably mounted inside stator 104 and represents at least one pole pair having a magnetic south pole and a magnetic north pole. Stator 104 has at least three separate stator windings W, V, U. Three Hall sensors 105, 106, 107 are situated in a gap between rotor 102 and stator 104. Hall sensors 105, 106, 107 are fixedly connected to stator 104. Hall sensors 105, 106, 107 are distributed uniformly around the circumference of rotor 102, one of the stator windings being allocated to each of the Hall sensors 105, 106, 107. Rotor 102 can move past Hall sensors 105, 106, 107.

For the highly dynamic field-oriented current and rotational speed regulation of an electric turbo compressor, as shown schematically in FIG. 1, knowledge of the rotational speed of rotor 102 and of the rotor position, i.e. of the position of rotor 102 relative to stator 104, is required. Here, it is in particular required that the rotor position, when at a standstill and at small rotational speeds in the range up to 10% of the nominal rotational speed, be determined as precisely as possible in order to realize a clean sinusoidal supply of current. In the range of higher rotational speeds greater than 10% of the nominal rotational speed, the rotational speed and the rotor position are standardly determined without the use of sensors. In the range of small rotational speeds, the rotational speed and the rotor position can be determined either via mechanical or optical rotational sensors or via Hall sensors 105, 106, 107. Here the direction of the magnetic field of rotor 102 is detected using Hall sensors 105, 106, 107, and from this the rotational speed and the rotor position are calculated.

Figure 2:
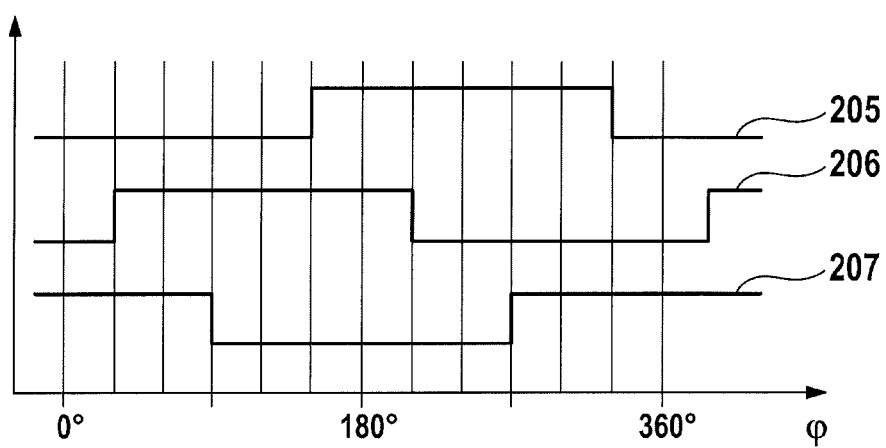
FIG. 2 shows a representation of Hall sensor signals.

FIG. 2 shows, in relation to FIG. 1, an example of a resulting signal pattern that is produced by Hall sensors 105, 106, 107 shown in FIG. 1 when there is a rotation of rotor 102. Shown is a first signal 205 of Hall sensor 105, a second signal 206 of Hall sensor 106, and a third signal 207 of Hall sensor 107. On the abscissa, the angular position of rotor 102, or the rotor position in degrees, is plotted. Rotor position 0° corresponds to an initial position, and rotor position 360° corresponds to a complete rotation. On the ordinate, values of signals 205, 206, 207 are plotted. Each of the signals 205, 206, 207 can assume two values. A first of these values shows a first magnetic field direction caused by rotor 102, and a second of these values shows a second magnetic field direction caused by rotor 102.

At the rotor position of 0°, Hall sensor 106 is situated in the region of influence of the north pole of rotor 102, and Hall sensors 105, 107 are situated in the region of influence of the south pole of rotor 102. Thus, third signal 207 has the second value, and signals 205, 206 have the first value. When rotor 102 rotates in the clockwise direction, at a rotor position of 30° there takes place a change of edge of second signal 206 from the first value to the second value, because Hall sensor 106 moves into the region of influence of the north pole of rotor 102. When there is a further rotation of rotor 102, at a rotor position of 90° there takes place a change of edge of third signal 207 from the second value to the first value, because Hall sensor 107 moves into the region of influence of the south pole of rotor 102. When there is a further rotation of rotor 102, at a rotor position of 150° there takes place a change of edge of first signal 206 from the first value to the second value, because Hall sensor 106 moves into the region of influence of the north pole of rotor 102. Upon further rotation of rotor 102, at a rotor position of 210° there takes place a change of edge of second signal 206 from the second value to the first value, because Hall sensor 106 moves into the region of influence of the south pole of rotor 102. As rotor 102 rotates further, at a rotor position of 270° there takes place a change of edge of third signal 207 from the first value to the second value, because Hall sensor 107 again moves into the region of influence of the north pole of rotor 102. Given further rotation of rotor 102, at a rotor position of 330° there takes place a change of edge of first signal 205 from the second value to the first value, because Hall sensor 105 moves into the region of influence of the south pole of rotor 102.

A change of sector of rotor 102 can be defined for example in each case by a rising edge, from the first value to the second value, of one of the signals 205, 206, 207, or, alternatively, by a falling edge, from the second value to the first value, of one of the signals 205, 206, 207. Alternatively, a change of sector can take place at rotor positions that do not coincide with a change of edge.

A rotational speed of rotor 102 can be determined through an evaluation of a temporal distance between at least two successive changes of edge of signals 205, 206, 207.

Figure 3:
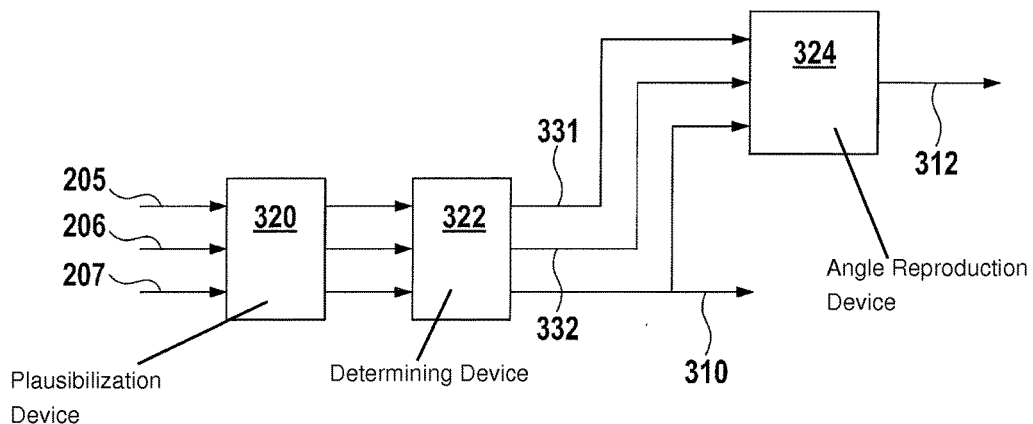
FIG. 3 shows a schematic diagram of a device for determining the rotor position and the rotational speed of a rotating field machine.

FIG. 3 shows a schematic diagram of a device for determining a rotational speed 310 and a rotor position 312 of a rotating field machine, based on Hall sensor signals 205, 206, 207. The rotating field machine can be the rotating field machine described on the basis of FIG. 1. Hall sensor signals 205, 206, 207 can be the Hall sensor signals described on the basis of FIG. 2. The device has a plausibilization device 320, a determining device 322, and an angle reproduction device 324.

Plausibilization device 320 is fashioned to receive Hall sensor signals 205, 206, 207, to plausibilize them, and to output them to determining device 322 as plausibilized Hall sensor signals.

Determining device 322 is fashioned to receive the plausibilized Hall sensor signals and, based on the plausibilized Hall sensor signals, to determine and output a sector 331 in which the rotor of the rotating field machine is situated, a direction 332 in which the rotor is moving, and rotational speed 310 of the rotor. Sector 331, direction 332, and rotational speed 310 can be outputted as electrical signals or as an item of sector information, an item of directional information, and an item of rotational speed information. The device is fashioned to output rotational speed 310 as an output signal.

Angle reproduction device 324 is fashioned to receive sector 331, direction 332, and rotational speed 310 from determining device 322, and, based thereon, to determine and evaluate rotor position 312. The device is fashioned to output rotor position 312 as an output signal.

In order to calculate the rotor position and the rotational speed, a plausibilization of Hall signals 205, 206, 207 is therefore first carried out. Subsequently, there takes place the calculation of rotational speed 310 directly from the temporal difference of the individual plausibilized signals 205, 206, 207. Sector 331 and direction 332 are calculated directly from the plausibilized Hall signals. Rotor position 312 is then determined directly from rotational speed 310 by integration. Sector 331 is used for the initialization of the integration.

Figure 4:
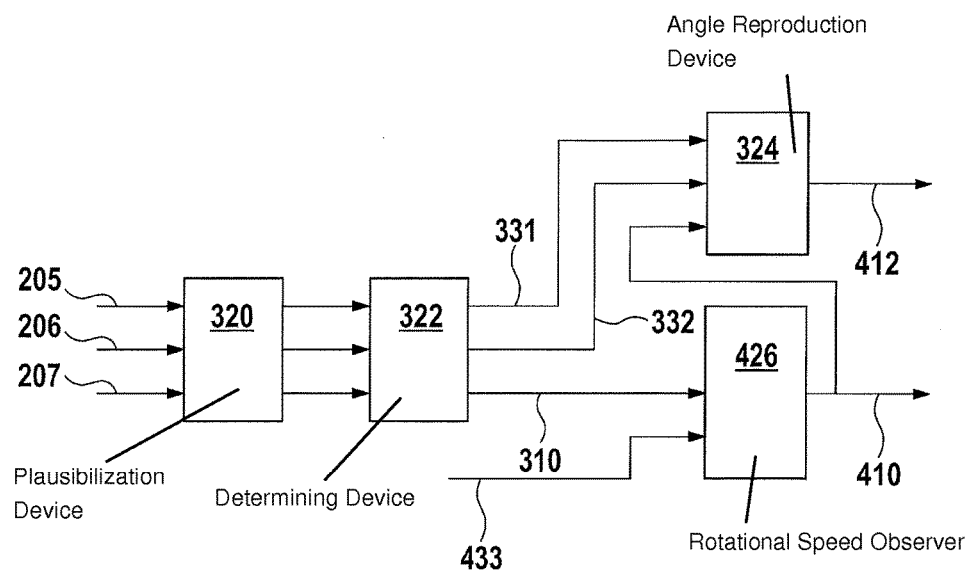
FIG. 4 shows a schematic diagram of a device for determining the rotor position and the rotational speed of a rotating field machine according to an exemplary embodiment of the present invention.

FIG. 4 shows a schematic diagram of a device for determining a rotational speed 410 and a rotor position 412 of a rotating field machine based on Hall sensor signals 205, 206, 207, according to an exemplary embodiment of the present invention. The rotating field machine can be the rotating field machine described on the basis of FIG. 1. Hall sensor signals 205, 206, 207 can be Hall sensor signals described on the basis of FIG. 2. The device has a plausibilization device 320, a determining device 322, an angle reproduction device 324, and a rotational speed observer 426.

Plausibilization device 320 is fashioned to receive Hall sensor signals 205, 206, 207, to plausibilize them, and to output them to determining device 322 as plausibilized Hall sensor signals.

Determining device 322 is fashioned to receive the plausibilized Hall sensor signals and, based on the plausibilized Hall sensor signals, to determine and to output a sector 331 in which the rotor of the rotating field machine is situated, a direction 322 in which the rotor is moving, and rotational speed 310 of the rotor.

Angle reproduction device 324 is fashioned to receive sector 331 and direction 332 from determining device 322 and to receive an observed rotational speed from rotational speed observer 426, and, based thereon, to determine and output rotor position 412. Rotor position 412 is thus determined using an observer. The device is fashioned to output rotor position 412 as an output signal.

Rotational speed observer 426 is fashioned to receive rotational speed 310 from determining device 322, and to receive an item of information about a current 433 in the q direction, and, based thereon, to determine observed rotational speed 410. Current 433 in the q direction corresponds to the current flowing through windings of the rotating field machine, by which a magnetic field is generated that causes a torque over 102. A value of current 433 can either be measured using a suitable measuring device or can be provided by a control device in order to set current 433. Observed rotational speed 410 is provided to angle reproduction device 324. In addition, the device is fashioned to output observed rotational speed 410 as an output signal.

According to an exemplary embodiment, a method for the disturbance-free calculation of rotational speed 410 and of rotor position 412 can be realized using the approach shown on the basis of FIG. 4.

Here, rotational speed 310 is first calculated immediately from incoming Hall signals 205, 206, 207, using direct differentiation. Here, first a plausibilization of the incoming Hall signals can take place. The quality of rotational speed signal 310 is subsequently substantially improved in a very disturbance-free fashion by rotational speed observer 426. This observed rotational speed 410 is used for regulation. The rotor position is no longer calculated immediately from the directly determined rotational speed 310, which is liable to disturbance, but rather from observed rotational speed 410, calculated by rotational speed observer 426.

In the following, the steps that are to be carried out according to this method according to an exemplary embodiment are described in detail.

First, a plausibilization 320 is carried out. Plausibilization 320 includes a reading in of Hall signals 205, 206, 207, and a debouncing of signals 205, 206, 207.

Using determining device 322, sector 331, direction 332, and rotational speed 310 are determined. First, in determining device 322 there takes place a determination of current sector 331 in which the rotor of the rotating field machine is situated, from the logical sequence of Hall signals 205, 206, 207. In addition, there takes place a determination of current direction of rotation 332 of the rotor, from the logical sequence of Hall signals 205, 206, 207, and a calculation of current rotational speed 310 from the temporal difference between two Hall signal edges of Hall signals 205, 206, 207. A plausibilization of rotational speed 310 is carried out as a function of the last-determined rotational speed.

For angle reproduction 324, there takes place a calculation of current rotor position 412 through integration of observed rotational speed 410. There takes place an initialization of the integrator upon each change of sector 331 through the initial value of current sector 331. In addition, there takes place a correction of rotor position 412 based on the situation of the Hall sensors relative to the initial rotor position of the rotating field machine.

Rotational speed observer 426 is a complete state observer, without remaining deviation, for rotational speed 410 of the rotating field machine. As input signals, rotational speed 310, already determined by differentiation, is used, as is stator current 433 in the q direction in the field-oriented coordinate system. At the output, an observed rotational speed 410 for further use in the rotational speed regulating system is provided. A stable dimensioning of observer 426 takes place through a direct pole specification.

Figure 5:
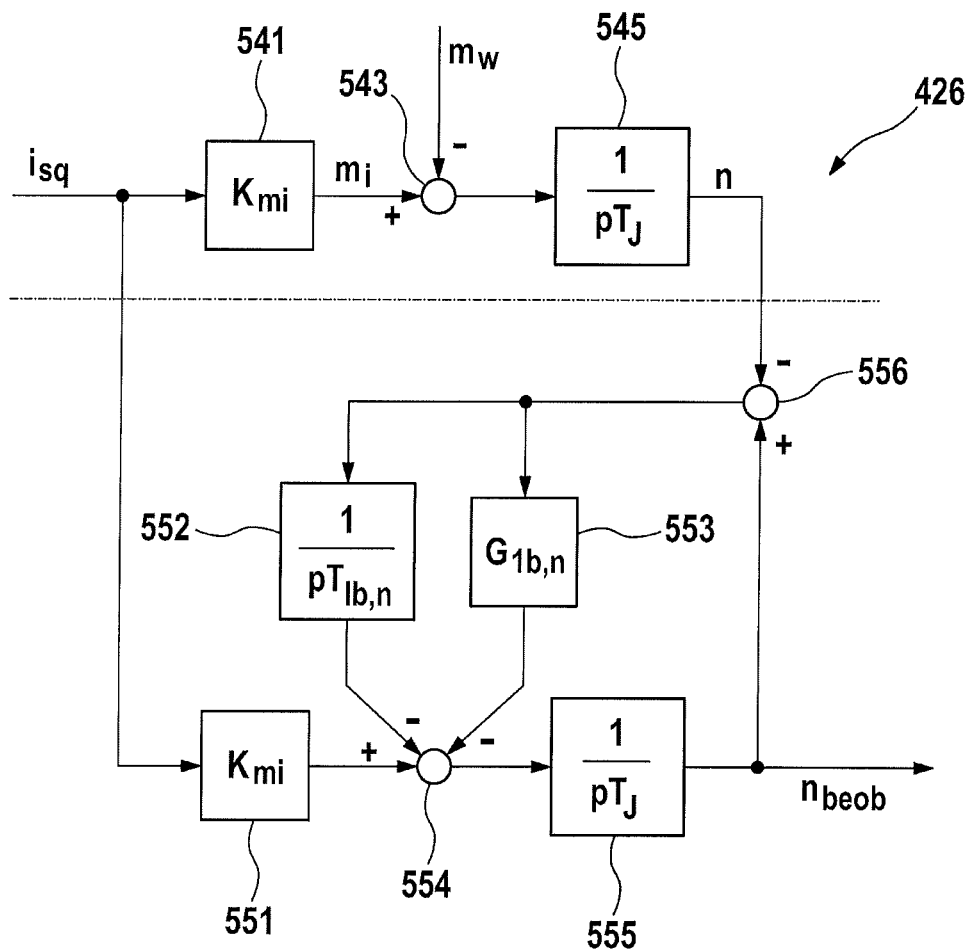
FIG. 5 shows a rotational speed observer according to an exemplary embodiment of the present invention.

FIG. 5 shows a rotational speed observer 426 according to an exemplary embodiment of the present invention. Rotational speed observer 426 is a complete state observer for determining the rotational speed of an electric motor, for example on the basis of the rotating field machine described in FIG. 1. Rotational speed observer 426 can be used in the exemplary embodiment described on the basis of FIG. 4.

Rotational speed observer 426 is fashioned to output, based on an input value $i_{sq}$ and a supplied value $m_w$, a value $n_{beob}$, corresponding to the observed rotational speed, as output quantity. Rotational speed observer 426 includes a regulation path model and an observer connected in parallel.

The regulation path model includes units 541, 543, 545. Unit 541 is fashioned to receive an input value $i_{sq}$ of rotational speed observer 426, and to determine therefrom a value $m_i$ using a function $K_{mi}$. Unit 543 is fashioned to reduce value $m_i$ by a value $m_w$ supplied to the regulation path, and to output it to unit 545. Thus, unit 543 can be realized as a subtraction unit. Unit 545 is fashioned to convert the value received from unit 543 into a value n, by executing a function $1/pT_J$, and to output it to unit 556 of the observer.

The observer includes units 551, 552, 553, 554, 555, 556. Unit 551 is fashioned to receive input value $i_{sq}$ of rotational speed observer 426 and to determine a value therefrom using function $K_{mi}$, and to output it to unit 554. Unit 552 is fashioned to receive an output value of unit 556 and to determine a value therefrom using a function $1/pT_{1b,n}$, and to output it to unit 554. Unit 553 is fashioned to receive an output value of unit 556 and to determine a value therefrom using a function $G_{1b,n}$, and to output it to unit 554. Unit 554 is fashioned to receive output values of units 552, 553 and to subtract them from an output value of unit 551. Unit 555 is fashioned to convert the value received from unit 554 into a value $n_{beob}$, through execution of function $1/pT_J$, and to output it to unit 556 of the observer. Unit 556 is fashioned to subtract the value n from the value $n_{beob}$ and to output the value resulting therefrom to units 552, 553.

Unit 556 is fashioned to subtract the value n from the value $n_{beob}$ and to output the resulting value to units 552, 553.

Rotational speed observer 426 is fashioned to output the value $n_{beob}$ as output quantity.

Figure 6:
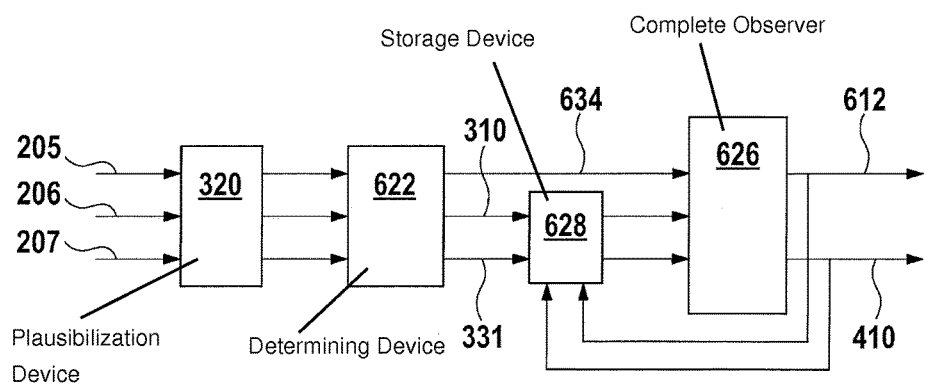
FIG. 6 shows a schematic diagram of a further device for determining the rotor position and the rotational speed according to an exemplary embodiment of the present invention.

In the following, the parameters used for rotational speed observer 426 are explained:

$i_{sq}$: current in the q direction of the electric motor
$K_{mi}$: normed torque constant of the electric motor
$m_i$: "internal" torque of the electric motor
$m_w$: resistance moment acting on the shaft of the electric motor
$1/pT_J$: integrator that completely describes the mechanical partial regulation path between the difference of the internal torque and the resistance moment on the one hand, and the rotational speed on the other hand.

n: current rotational speed of the rotor of the electric motor $1/pT_{1b,n}$: observer integrator that completely reproduces the mechanical partial regulation path between the difference of the internal torque and the resistance moment on the one hand and the rotational speed on the other hand $G_{1b,n}$: proportionality factor of the observer $n_{beob}$: observed rotational speed of the rotor of the electric motor FIG. 6 shows a schematic diagram of a device for determining a rotational speed 410 and a rotor position 612 of a rotating field machine based on Hall sensor signals 205, 206, 207 according to an exemplary embodiment of the present invention. The rotating field machine can be a rotating field machine described on the basis of FIG. 1. Hall sensor signals 205, 206, 207 can be the Hall sensor signals described on the basis of FIG. 2. The device has a plausibilization device 320, a determining device 622, a complete observer 626 and a storage device 628.

Plausibilization device 320 is fashioned to receive Hall sensor signals 205, 206, 207, to plausibilize them, and to output them to determining device 322 as plausibilized Hall sensor signals.

Determining device 622 for determining an acceleration, a rotational speed, and a sector is fashioned to receive the plausibilized Hall sensor signals and, based on the plausibilized Hall sensor signals, to determine and output a sector 331 in which the rotor of the rotating field machine is situated, a rotational speed 310 of the rotor, and an acceleration 634 of the rotor.

The storage device is fashioned to receive rotational speed 310 and sector 331 from determining device 622, and to receive an observed rotational speed 410 and an observed rotor position 612 from complete observer 626, and to output either rotational speed 310 and sector 331 or observed rotational speed 410 and observed rotor position 612 to complete observer 626.

Complete observer 626 is fashioned to receive acceleration 634 from determining device 622 and to receive rotational speed 310 and sector 331, or to receive observed rotational speed 410 and observed rotor position 612, from storage device 628 and, based thereon, to determine and to output observed rotor position 612 and observed rotational speed 410. The device is fashioned to output observed rotor position 612 and observed rotational speed 410 as output signals.

According to an exemplary embodiment, a method for disturbance-resistant calculation of rotational speed 410 and of rotor position 612 can be realized using the approach shown in FIG. 6.

Here, rotational speed 310 and acceleration 634 are first calculated immediately from incoming Hall signals 205, 206, 207, using simple, or two-part, direct differentiation. Here, first a plausibilization of incoming Hall signals 205, 206, 207 can take place. Using complete state observer 626 of the mechanical regulation path of the rotating field machine, based on the calculated acceleration 634 and rotational speed 310, and of the current sensor 331, both rotor position 612 and rotational speed 410 of the machine are observed. For the stabilization and synchronization of observer 626, observed output quantities 612, 410 between two Hall edges of Hall signals 205, 206, 207 are fed back as input quantities.

In the following, the steps that are to be carried out according to this method are described in detail, according to an exemplary embodiment.

First, a plausibilization 320 is carried out. Plausibilization 320 includes a reading in of Hall signals 205, 206, 207 and a debouncing of signals 205, 206, 207.

For the determination 622 of the sector, the rotational speed, and the acceleration, there takes place a determination of current sector 331 in which the rotor of the rotating field machine is situated, from the logical sequence of Hall signals 205, 206, 207. In addition, there takes place a calculation of current rotational speed 310, including the current rotational direction, from the temporal difference between two Hall signal edges of Hall signals 205, 206, 207. A plausibilization of rotational speed 310 is carried out as a function of the last-determined rotational speed. A calculation of the current acceleration takes place from the change in rotational speed. A plausibilization of the acceleration is carried out as a function of the last-determined acceleration.

With regard to storage 628, each time there is a change of sector complete observer 626 is supplied with new values of currently determined sector 331 and rotational speed 310. If no change of sector takes place, observed rotational speed 410 and rotor position 612 are returned.

Complete observer 626 is realized as a complete Luenberger observer. As input signals, complete observer 626 receives acceleration $\ddot{\theta}$, rotational speed $\dot{\theta}$, and rotor position $\theta$, corresponding to signals 634, 310, 628, 612, 410.

From this there results an input vector $$U = \begin{bmatrix} \ddot{\theta} \\ \dot{\theta} \\ \theta \end{bmatrix}.$$

As output signals, complete observer 626 provides observed rotational speed $\hat{\dot{\theta}}$ and observed rotor position $\hat{\theta}$.

From this there results an output and state vector $$\hat{Y} = \hat{X} = \begin{bmatrix} \hat{\dot{\theta}} \\ \hat{\theta} \end{bmatrix}$$

The state system of complete observer 626 can be described as follows:

$$\frac{d\hat{X}}{dt} = A \cdot \hat{X} + B \cdot U$$

$$\hat{Y} = I_2 \cdot \hat{X}$$

As observer 626, a complete Luenberger observer is thus used for the mechanical part of the rotating field machine, based on the acceleration up to the rotor position. At the output of observer 626, observed rotational speed signal 410 and observed rotor position signal 612 are available for further use in the rotational speed regulating system. A stable dimensioning of observer 626 takes place through a direct pole specification.

Figure 7:
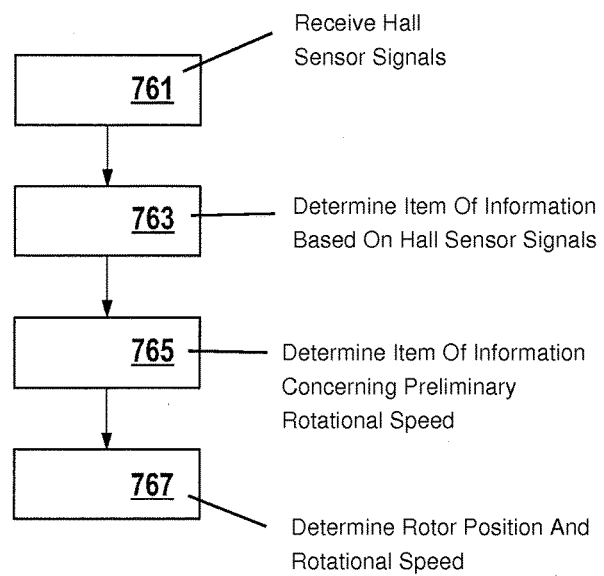
FIG. 7 shows a flow diagram of a method for determining the rotor position and the rotational speed according to an exemplary embodiment of the present invention.

FIG. 7 shows a flow diagram of a method for determining the rotor position and the rotational speed of a rotating field machine according to an exemplary embodiment of the present invention. The rotating field machine can be the rotating field machine described on the basis of FIG. 1. In a step 761, Hall sensor signals, for example the signals described on the basis of FIG. 2, are continuously received. In a step 763, an item of information about the sector is determined based on the Hall sensor signals. The information about the sector can define an angular range in which a reference point of the rotor of the rotating field machine was or is situated at the time of acquisition of the Hall sensor signals. In a step 765, an item of information is determined concerning a preliminary rotational speed, based on the Hall sensor signals. The item of information about the preliminary rotational speed can correspond to a rotational speed of the rotor determined from the current and preceding Hall sensor signals. In a step 767, using an observer the rotor position and the rotational speed of the rotating field machine are determined based on the information about the sector and the information about the preliminary rotational speed.

According to an exemplary embodiment, Hall sensors are used for the acquisition of the position of the rotor. The Hall signals of the sensors are plausibilized. The rotational speed of the rotor is calculated by a differentiation in a "conventional" manner, and is relatively liable to disturbance. The rotational speed signal calculated in this way is substantially improved by a rotational speed observer. An alternative is presented by the direct calculation of the acceleration with subsequent improvement by the observer. Thus, an observer is used to improve the Hall signals. An existing rotational speed signal can also be improved by an observer.

The exemplary embodiments described and shown in the Figures have been chosen only as examples. Different exemplary embodiments can be combined with one another in their entirety or with regard to individual features. An exemplary embodiment can also be supplemented by features of a further exemplary embodiment. In addition, method steps according to the present invention can be repeated, and can be carried out in a sequence differing from that described.

What is claimed is:

1. A method for determining a rotor position and a rotational speed of a rotating field machine, comprising; determining a sector in which a rotor of the rotating field machine is situated, based on Hall sensor signals, the Hall sensor signals representing signals outputted by Hall sensors situated in a region of the rotor, wherein a change of sector can take place when, due to a rotation of the rotor, a reference point situated on the rotor moves from one sector into an adjacent sector; determining a preliminary rotational speed of the rotating field machine, based on the Hall sensor signals; and determining the rotor position and the rotational speed based on the sector and on the preliminary rotational speed, an observer of the rotating field machine being used at least for the determining of the rotational speed, wherein: in the step of determining the sector, the sector is determined based on a temporal sequence of the Hall sensor signals, and in the step of determining the preliminary rotational speed, the preliminary rotational speed is determined from a temporal difference between successive edges of the Hall sensor signals; and regulating the rotational speed of the rotating field machine in accordance with the determined rotor position and the determined rotational speed.

2. The method as recited in claim 1, further comprising: determining a direction of rotation of the rotor based on the Hall sensor signals, wherein in the step of determining the rotor position and of the rotational speed, the rotor position is determined based on the sector, the direction of rotation, and the rotational speed, wherein the rotational speed is determined using the observer, based on the preliminary rotational speed and on a current of the rotating field machine that causes a torque of the rotor.

3. The method as recited in claim 2, wherein in the step of determining the rotor position and of the rotational speed the rotor position is determined based on a summation of the rotational speed through integration.

4. The method as recited in claim 1, further comprising: determining an acceleration of the rotor based on the Hall sensor signals, wherein in the step of determining the rotor position and the rotational speed, the rotor position and the rotational speed are determined using the observer, based on the sector, the preliminary rotational speed, and the acceleration.

5. The method as recited in claim 4, wherein in the step of determining the rotor position and the rotational speed, the rotor position and the rotational speed are determined, when there is a change of sector, based on the sector and on the preliminary rotational speed, and are otherwise determined based on the rotor position determined and fed back using the observer, and on a rotational speed determined and fed back using the observer.

6. The method as recited in claim 1, further comprising: receiving and plausibilizing the Hall sensor signals according to a low-pass filtering.

7. A device for determining a rotor position and a rotational speed of a rotating field machine, comprising:
an arrangement for determining a sector in which a rotor of the rotating field machine is situated, based on Hall sensor signals, the Hall sensor signals representing signals outputted by Hall sensors situated in a region of the rotor, wherein a change of sector can take place when, due to a rotation of the rotor, a reference point situated on the rotor moves from one sector into an adjacent sector;
an arrangement for determining a preliminary rotational speed of the rotating field machine, based on the Hall sensor signals; and
an arrangement for determining the rotor position and the rotational speed based on the sector and on the preliminary rotational speed, an observer of the rotating field machine being used at least for the determining of the rotational speed, wherein:
the arrangement for determining the sector determines the sector based on a temporal sequence of the Hall sensor signals, and
the arrangement for determining the preliminary rotational speed determines the preliminary rotational speed from a temporal difference between successive edges of the Hall sensor signals.

8. A rotating field machine, comprising: a rotor; a stator having at least three Hall sensors, each of the Hall sensors being configured to acquire a direction of a magnetic field of the rotor and to output a respective Hall sensor signal as a function of the direction; and a device for determining a rotor position and a rotational speed of the rotating field machine, the device including: an arrangement for determining a sector in which the rotor of the rotating field machine is situated, based on the Hall sensor signals, the Hall sensor signals representing signals outputted by the Hall sensors situated in a region of the rotor, wherein a change of sector can take place when, due to a rotation of the rotor, a reference point situated on the rotor moves from one sector into an adjacent sector; an arrangement for determining a preliminary rotational speed of the rotating field machine, based on the Hall sensor signals; an arrangement for determining the rotor position and the rotational speed based on the sector and on the preliminary rotational speed, an observer of the rotating field machine being used at least for the determining of the rotational speed, wherein: the arrangement for determining the sector determines the sector based on a temporal sequence of the Hall sensor signals, and the arrangement for determining the preliminary rotational speed determines the preliminary rotational speed from a temporal difference between successive edges of the Hall sensor signals; and an arrangement for regulating the rotational speed of the rotating field machine in accordance with the determined rotor position and the determined rotational speed.

9. A computer program product having program code for carrying out on a device a method for determining a rotor position and a rotational speed of a rotating field machine, comprising:
  determining a sector in which a rotor of the rotating field machine is situated, based on Hall sensor signals, the Hall sensor signals representing signals outputted by Hall sensors situated in a region of the rotor, wherein a change of sector can take place when, due to a rotation of the rotor, a reference point situated on the rotor moves from one sector into an adjacent sector;
  determining a preliminary rotational speed of the rotating field machine, based on the Hall sensor signals; and
  determining the rotor position and the rotational speed based on the sector and on the preliminary rotational speed, an observer of the rotating field machine being used at least for the determining of the rotational speed, wherein:
    in the step of determining the sector, the sector is determined based on a temporal sequence of the Hall sensor signals, and
    in the step of determining the preliminary rotational speed, the preliminary rotational speed is determined from a temporal difference between successive edges of the Hall sensor signals.

10. The method of claim 1, wherein the observer determines the rotational speed based at least on a current flowing through windings of the rotating field machine in a q direction relating to a d-q system.

11. The device of claim 7, wherein the observer determines the rotational speed based at least on a current flowing through windings of the rotating field machine in a q direction relating to a d-q system.

12. The rotating field machine of claim 8, wherein the observer determines the rotational speed bases at least on a current flowing through windings of the rotating field machine in a q direction relating to a d-q system.

13. The computer program product of claim 9, wherein the observer determines the rotational speed bases at least on a current flowing through windings of the rotating field machine in a q direction relating to a d-q system.

* * * * *